F. PRUDHOMME.
MANUFACTURE OF PIG IRON.
APPLICATION FILED AUG. 30, 1912.
1,092,168.
Patented Apr. 7, 1914.
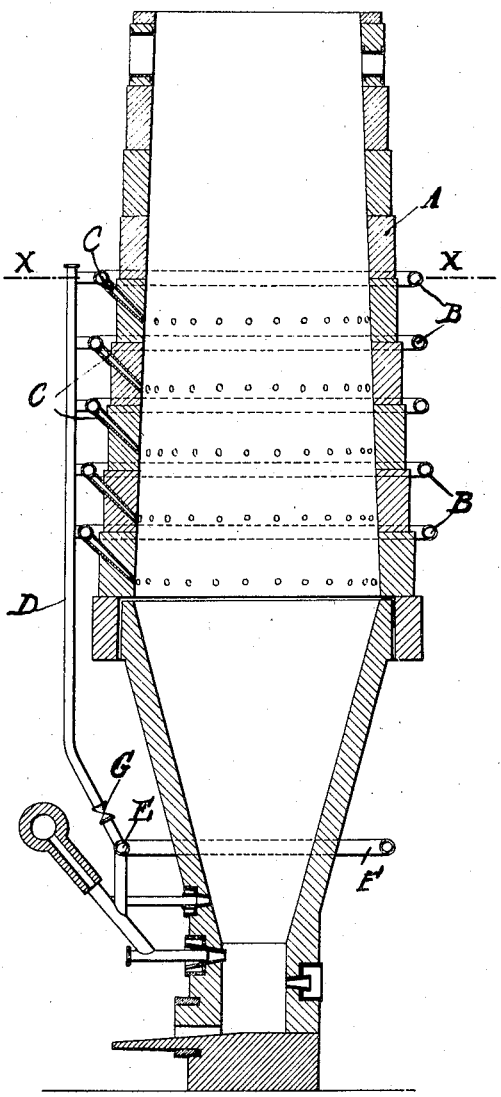
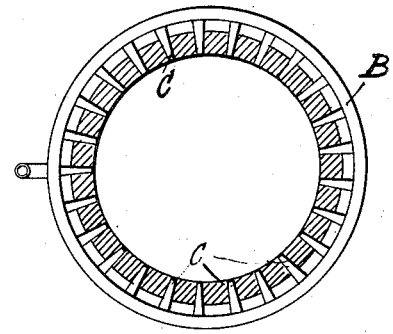
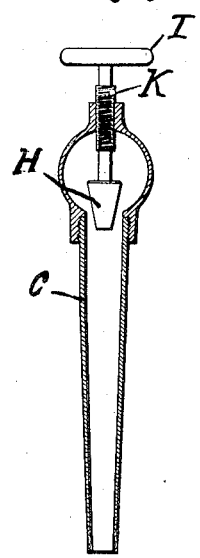
Witnesses.
Gertrude M. Hulst
S. Kraus.
Inventor
François Prudhomme
per Laurence Langner
Attorney.

UNITED STATES PATENT OFFICE.

FRANÇOIS PRUDHOMME, OF VIENNE, FRANCE.

MANUFACTURE OF PIG-IRON.

1,092,168. Specification of Letters Patent. Patented Apr. 7, 1914.

Application filed August 30, 1912. Serial No. 717,929.

*To all whom it may concern:*

Be it known that I, FRANÇOIS PRUDHOMME, a citizen of the Republic of France, residing at Vienne, Isère, France, have invented a certain new and useful Improvement in the Manufacture of Pig - Iron, of which the following is a specification.

Generally speaking, carbonized fuels such as coke and wood charcoal are employed for charging shaft furnaces, blast furnaces, copper furnaces, lead furnaces, lime kilns and so forth. Sometimes a mixture of carbonized fuel and soil and ground fuel, such as coal, lignite, peat and wood is employed, the soil and ground fuel being more or less desiccated previously. More rarely (except as regards coal) attempts have been made to consume the soil and ground fuels alone. In this case difficulties are encountered which arise from the fact that the carbonization is not effected in the best part of the furnace; this cools the zone in which the reduction should be completed and the fusion effected and also causes irregular operation of the apparatus.

The object for the present invention is a device applicable to shaft furnaces of all kinds (blast furnaces, copper furnaces, lead furnaces, lime kilns and so forth) rendering it possible to employ in these furnaces soil and ground fuels of all kinds such as coal, lignite, peat, wood and so forth in the crude state or partly desiccated in obviating the defects set forth above.

The invention will be readily understood by the description which follows and reference to the accompanying drawing, in which:—

Figure 1 is a vertical sectional elevation of the shaft furnace. Fig. 2 is a horizontal section on the line X—X showing the uppermost series of twyer apertures in the furnace wall and the corresponding twyer ring, the lower twyer rings and other construction not being illustrated. Fig. 3 is a section to a larger scale of an inclined twyer.

As shown in the drawing, the device employed consists in arranging around the body A of the shaft furnace a certain number of superposed rings B provided with inclined twyers C entering the wall of the furnace and passing through it. These twyers connect with the ring, all the rings being branched off one or more conduits D which are themselves branched at E off the blower. By means of a cock G the supply of air furnished by the blower to the conduit D and thence to the shaft of the furnace can be regulated. The object of this introduction of air is to burn in the said shaft a quantity of gas such that this combustion generates the number of heat units necessary for completing in the shaft itself the carbonization of the soil and ground fuel supplied. In reality, owing to this additional heat, the entire operation proceeds precisely as if the charge were of carbonized fuel. The quantity of air to be introduced and consequently of gas to be burnt varies with the nature of the fuel and the percentage of water that it contains. The essential condition, however, is that the total number of heat units to be produced should be distributed in sufficient numbers at all parts of the shaft so that the temperature shall not at any point attain a sufficient degree for the production to any appreciable extent of secondary re-actions such as a premature fusion, scorification or conversion of the carbonic acid into the carbonic oxid, re-actions which would impede the operation of the shaft furnace.

For sake of example it may be assumed that it is necessary to produce a million heat units per ton of soil and ground fuel supplied in order to complete the carbonization in the shaft proper of the shaft furnace. Now if the necessary air is introduced through four twyers each twyer will produce $$\frac{1000000}{4} = 250000 \text{ heat units}$$

which will certainly give rise in the operative zone of these twyers to the undesired secondary re-actions referred to above. If, however, the same quantity of air is introduced through 200 twyers, as each twyer produces only $$\frac{1000000}{200} = 5000 \text{ heat units}$$

or 50 times less, it will not cause the temperature to rise in the active zone beyond an amount which will not in any way impede the operation of the shaft furnace. The combustion air should therefore be introduced through a very large number of twyers suitably distributed throughout the entire surface and the entire height of the shaft. The number of these twyers and also the quantity of air introduced through them varies in accordance with the furnace and the nature of the fuel but the principle of the invention is that the number of twyers should be very large; 20 twyers may be mentioned by way of a concrete example.

25 twyers per ring have been shown in the drawing and it has been assumed that there are 5 superposed rings. Each twyer is provided with a device which enables it to supply a larger or smaller quantity of air; this together with the cocks provided on the branch of each ring permits of great elasticity in the regulation of the air introduced. The shaft furnace having been started and the gas liberated by the combustion of the carbonized fuel kindled once for all opposite each row of small twyers in the shaft the combustion of the gas continues in front of each of these twyers thus furnishing the quantity of heat necessary for increasing the carbonization and for completing it during the time that the soil and ground fuel supplied at the furnace mouth occupies in traversing the shaft. In this manner the fuel reaches the level of the boshes completely carbonized and at the relatively high temperature at which the carbonization has been completed. This temperature is obviously that of the materials of the fusion bed arriving at the same time at the same point. The combustible mixture, fluxes and ore therefore enter the reduction and fusion zone in the most favorable conditions for the efficient operation of the shaft furnace. Notwithstanding this, owing to the large number of twyers appropriately distributing the heat in the shaft the temperature will not rise to a point which might occasion harmful secondary re-actions. The heat necessary is furnished by the combustion of a part of the gases produced in the shaft furnace. As these gases are much richer in heat units than those of ordinary shaft furnaces, owing to the mixture of the gases produced by the distillation with those produced by the combustion of the carbonized fuel, this partial combustion in the shaft does not form any impediment to the subsequent utilization of the gases which issue containing still more heat units than those of ordinary shaft furnaces.

In addition to producing gas, the soil or ground fuels produce during their distillation by-products which are generally speaking of high value, such as tar, acetic acid, ammonia, methylic alcohol and so forth, according to the nature of the fuel employed. These products can be collected by condensation or washing on leaving the shaft furnace; this constitutes one of the main advantages of shaft furnaces provided with the device forming the object of the present invention. Owing to this distillation device, the carbonization and the fusion can be effected in the same apparatus.

The following advantages result from the employment of soil and ground fuels which is rendered practically possible by the device which forms the object of the present invention: (1) All expense necessitated by carbonization such as labor, waste, depreciation of the carbonization plant, is eliminated; (2) the appreciable heat of the carbonized fuel which it is no longer necessary to cool on leaving the carbonizing furnace and to re-heat in the shaft furnace, is utilized; (3) gases which are more abundant and contain a larger number of heat units owing to the mixture of the gases arising from the distillation of the soil fuel with those coming from the combustion of the carbonized fuel, are produced by the shaft furnace, a portion only of the distillation gases being used for furnishing the heat necessary for the carbonization; (4) the collection at the outlet from the shaft furnace of the by-products specified above which arise in the distillation of the soil fuel, is made possible.

What I claim and desire to secure by Letters Patent of the United States is:—

1. A method whereby soil fuels can be employed for charging furnaces, which consists in effecting the combustion of a mixture of gas and air at a large number of twyer openings located on the inner surface of the furnace shaft, and maintaining the temperature at each of said twyer openings sufficiently low to prevent the production at any point of objectionable secondary reactions.

2. A method whereby soil fuels can be employed for charging furnaces, which consists in supplying a quantity of air through a large number of twyers located around the wall of the furnace shaft, mixing said air with the gases liberated by the distillation of fuel whereby the soil fuel can be carbonized, and maintaining the temperature at each of said twyers sufficiently low to prevent the production of objectionable secondary reactions at any part of the furnace charge.

3. A method whereby soil fuels can be employed for charging furnaces, which consists in effecting the carbonization of the soil fuel by the combustion of a portion of the gases generated by the furnace with a regulable quantity of air supplied by a blower to a relatively large number of points at the inner wall of the furnace shaft located at substantially the central zone thereof, and preventing the temperature at each of said points from rising sufficiently to produce objectionable secondary reactions.

4. A method whereby soil fuels can be employed for charging furnaces, which consists in supplying a regulable quantity of air through a number of rings of twyers located above the boshes of the furnace, mixing the said air with the gases liberated by the distillation of the soil fuel, completing the carbonization of the soil fuel by the ignition of the combustible mixture, and maintaining the temperature at each of said twyers sufficiently low to prevent objectionable secondary reactions.

5. A method whereby soil fuels can be employed for charging furnaces, which consists in supplying a quantity of air to a large number of points within the furnace shaft, mixing the said air with gases liberated within the furnace to obtain the required number of heat units to effect the complete carbonization of the soil fuel and maintaining the temperature at each of said points sufficiently low to prevent the production of undesirable secondary reactions.

6. A method whereby soil fuels can be employed for charging furnaces which consists in supplying a quantity of air to a large number of points within the furnace shaft, consuming in the furnace shaft the said air with a quantity of the gases liberated by the combustion of the carbonized fuel whereby the soil fuel can be carbonized, maintaining the temperature at each of the said points sufficiently low to prevent undesirable secondary reactions, and treating the gases liberated by the carbonization of the soil fuel for the recovery of by-products.

FRANÇOIS PRUDHOMME.

Witnesses:
HENRI LETTAL,
LUCIAN MEMMINGER.